Patented Nov. 30, 1926.

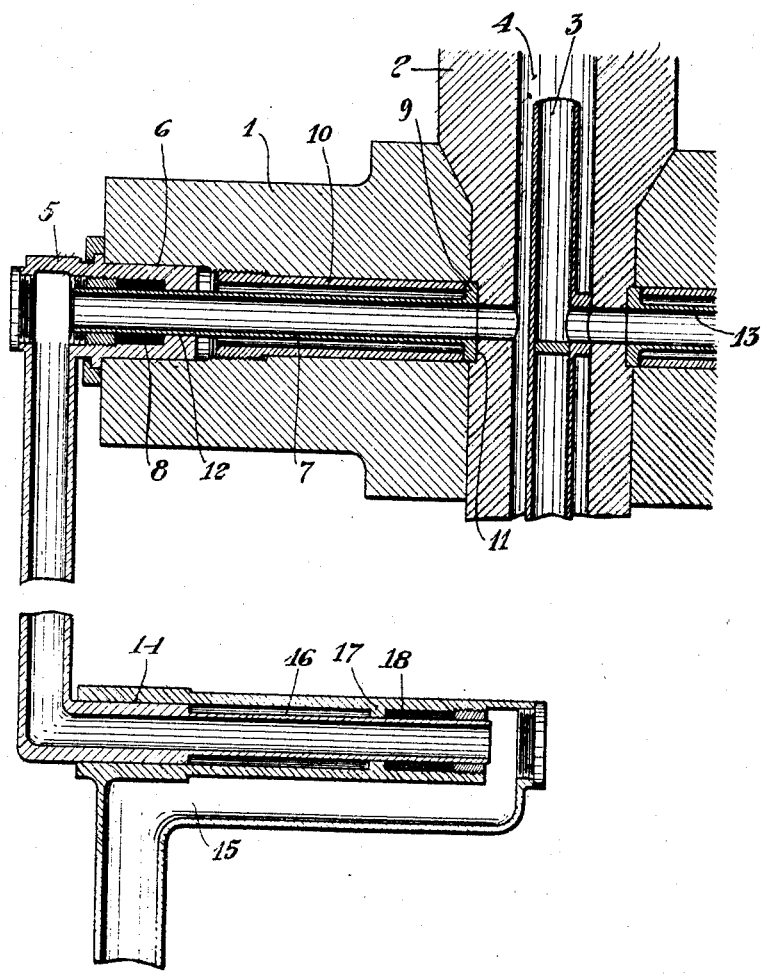

1,608,584

UNITED STATES PATENT OFFICE.

OSCAR ALEXIUS DERANS, OF NYNASHAMN, SWEDEN, ASSIGNOR TO SVENSKA AKTIEBOLAGET NOBEL-DIESSEL, OF NYNASHAMN, SWEDEN, A CORPORATION.

PACKING DEVICE FOR TURNABLE JUNCTION TUBES IN RECIPROCATING MACHINE PARTS.

Application filed April 9, 1924, Serial No. 705,347, and in Sweden April 6, 1923.

This invention relates to a packing device for turnable junction tubes in reciprocating machine parts, for instance in internal combustion engines having pistons cooled by fluid. In such engines the cooling fluid is, as known, conducted through a turnable junction tube at the one side of the cross-head, passes through the cross-head and through a channel in the hollow piston rod to the working piston and is hence conducted through another channel in the piston rod to the other side of the cross-head, from where it is discharged through a junction tube, which is also turnable with relation to the cross-head. As known, it is in this case of considerable importance that the cooling fluid is prevented from forcing its way out so as to be mixed with the oil stored in the lower part of the engine or, in other words, that the circulation system for the cooling fluid is entirely free from leakage. Hitherto, this has caused great difficulties, particularly of the turnable junction tubes of the cross-head and also at other turnable junction tubes of the fluid conduit, since, due to the unavoidable radial stresses occurring when running the engine, the bearings of the turnable junction tubes as well as the packing surfaces will soon be worn out and cause leakage.

The present invention has for its object to avoid the said disadvantage and to perform an effective and durable packing at the turnable junction tubes. The invention consists, essentially, in this that the turnably mounted junction tube is provided with or formed as an elastic pipe connected to a fluid conduit and freely suspended to part of its length, a packing being provided between said elastic pipe and the junction tube or that part, in which the junction tube is mounted. By such means the radial stresses will be received solely by the bearings of the junction tube, which have no connection with the fluid conduit, whereas the packing surfaces, due to the free suspending and the elasticity of the pipe connected to the junction tube, will be entirely relieved from the said stresses, the risk of wear and the leakage at the packing places due thereto being, thus, reduced to a considerable extent.

In the annexed drawing one form of embodiment of a packing device according to this invention are shown used in an internal combustion engine having a piston cooled by fluid.

Referring to the drawing 1 designates the cross-head having rigidly secured to it the piston rod 2. The piston rod 2 is hollow in known manner and provided with a centrally arranged pipe 3, between which and the wall of the bore is formed an annular channel 4 leading to the interior of the piston and serving, generally, as a supply conduit for the cooling fluid, the pipe 3 forming the discharge conduit for the cooling fluid from the piston. The junction tube 5 turnable with relation to the cross-head 1 is mounted at 6. Provided in the junction tube 5 is according to the invention a pipe 7 extending through the cross-head, a packing 8 being provided between said pipe and the junction tube. At the inner end directed towards the channel 4 in the piston rod the pipe 7 is provided with an annular flange 9, pressed tightly against a seat 11 in the piston rod by means of a sleeve 10 screw-threaded at its outer end. The outer diameter of the pipe 7 is less than the inner diameter of the sleeve 10, so that the pipe 7 will be freely suspended between the seat 11 and the connection 12 in the junction tube 5. By such means the packing 8 and the connection 12, respectively, will, practically, be entirely relieved from the radial stresses occurring on reciprocating the cross-head, the said stresses being received by the bearing 6. Thus, there occurs between the pipes 5 and 7 and between those and the packing 8 a pure turning movement only, which will not cause any wear worth mentioning. As apparent, the bearing place 6, at which wear cannot be avoided, has no communication at all with the conduit for the cooling fluid, which is formed within the cross-head 1 by the pipe 7. The discharge pipe 13 connected to the pipe 3 in the piston rod 2 is arranged and connected to its appertaining junction tube in the same manner as is the supply pipe 7 for the cooling fluid.

In the present case, the other end of the junction tube 5, which is in known manner turnably mounted at 14 in a swingable conduit 15 for the cooling fluid, is provided with an elastic extension 16 freely suspended to a certain part of its length, a packing 18 being provided between the free end of said extension and a guide 17 formed in the conduit 15. It is obvious that the radial stresses occurring on swinging the conduit 15 will be received solely at the bearing place 14, which has no communication with the fluid conduit, whereas the packing place 18, due to the free suspension and the elasticity of the extension 16, will be relieved from the said stresses.

If desired, the packing at the fluid conduit 15 may, obviously, be constructed in the same manner as is the packing in the crosshead and, further, the conduit 15 may be provided with such a packing also at the point 14. Further, it is to be noted that the seat 11 for the pipe 7 may also be formed in the cross-head proper instead of in the piston rod, as shown. Besides, the other end (not shown) of the conduit 15 may be provided with a packing device according to the invention.

What I claim as new and desire to secure by Letters Patent of the United States of America is:—

1. In a machine having reciprocating parts, the provision of fluid junction tubes turnably mounted in said reciprocating parts, said turnably mounted tube being provided with an elastic pipe freely suspended to a certain part of its length, a packing being provided between said elastic pipe and the part surrounding it and turning with relation to said pipe.

2. In a machine having reciprocating parts, the provision of fluid junction tubes turnably mounted in said reciprocating parts, said turnably mounted tube being provided with an elastic pipe turning with relation to said tube and freely suspended to a certain part of its length, a packing being provided between said elastic pipe and said junction tube.

3. In a machine having reciprocating parts, the provision of fluid junction tubes turnably mounted in said reciprocating parts, said turnably mounted tube being provided with an elastic pipe freely suspended to a certain part of its length, a packing being provided between said elastic pipe and the part surrounding it and turning with relation to said pipe, the bearings of said turnably mounted junction tube being disposed wholly out of communication with the fluid conduit formed by said tube and said elastic pipe.

4. In a machine having reciprocating parts, the provision of fluid junction tubes turnably mounted in said reciprocating parts, said turnably mounted tube being provided with an elastic pipe turning with relation to said tube and freely suspended to a certain part of its length, a packing being provided between said elastic pipe and said junction tube, the bearings of said turnably mounted junction tube being disposed wholly out of communication with the fluid conduit formed by said tube and said elastic pipe.

5. In an internal combustion engine having reciprocating parts, the provision of fluid junction tubes turnably mounted in said reciprocating parts, said turnably mounted tube being provided with an elastic pipe freely suspended to a certain part of its length, a packing being provided between said elastic pipe and the part surrounding it and turning with relation to said pipe.

6. In an internal combustion engine having reciprocating parts, the provision of fluid junction tubes turnably mounted to said reciprocating parts, said turnably mounted tube being provided with an elastic pipe turning with relation to said tube and freely suspended to a certain part of its length, a packing being provided between said elastic pipe and said junction tube.

7. In an internal combustion engine having reciprocating parts, the provision of fluid junction tubes turnably mounted in said reciprocating parts, said turnably mounted tube being provided with an elastic pipe freely suspended to a certain part of its length, a packing being provided between said elastic pipe and the part surrounding it and turning with relation to said pipe, the bearings of said turnably mounted junction tube being disposed wholly out of communication with the fluid conduit formed by said tube and said elastic pipe.

8. In an internal combustion engine having reciprocating parts, the provision of fluid junction tubes turnably mounted in said reciprocating parts, said turnably mounted tube being provided with an elastic pipe turning with relation to said tube and freely suspended to a certain part of its length, a packing being provided between said elastic pipe and said junction tube, the bearings of said turnably mounted junction tube being disposed wholly out of communication with the fluid conduit formed by said tube and said elastic pipe.

In testimony whereof I affix my signature.

OSCAR ALEXIUS DERANS.